United States Patent [19]

Meguerdichian et al.

[11] Patent Number: 5,272,287
[45] Date of Patent: Dec. 21, 1993

[54] ELEVATOR CAR AND RISER TRANSFER

[75] Inventors: Gary M. Meguerdichian, Farmington; Paul Stranieri, Bristol; David M. Hughes, New Britain; Bertram F. Kupersmith, Avon, all of Conn.

[73] Assignee: Otis Elevator Company, Farmington, Conn.

[21] Appl. No.: 853,678

[22] Filed: Mar. 19, 1992

[51] Int. Cl.⁵ .............................. B66B 1/00; H04J 3/08
[52] U.S. Cl. .................................... 187/100; 187/124; 187/128; 370/16.1
[58] Field of Search ............... 187/128, 100, 126, 124, 187/130, 101, 102

[56] References Cited

U.S. PATENT DOCUMENTS

| 4,298,100 | 11/1981 | Süss et al. | 187/126 |
| 4,326,606 | 4/1982 | Kuzunuki et al. | 187/102 |
| 4,989,695 | 2/1991 | Kubo | 187/101 |
| 5,146,053 | 9/1992 | Powell et al. | 187/127 |
| 5,202,540 | 4/1993 | Aver et al. | 187/101 |

Primary Examiner—Steven L. Stephan
Assistant Examiner—Robert Nappi

[57] ABSTRACT

The data processor (OCSS) 35 of an elevator car that can be transferred from a group 38 of elevators (a swing car) is switched out of a ring of similar data processors 31-34 into another ring of data processors 36, 37 which comprise a separate group 39 (FIG. 2). Or, the processor 35 can be swung from the group 38 into operation by itself in the simplex mode (FIGS. 3 and 4) when connected (66) to a separate hall call button and enunciator lantern riser 56.

4 Claims, 7 Drawing Sheets

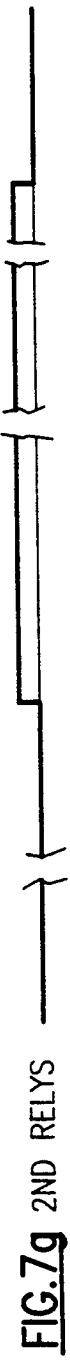
FIG.7a SWNG OPRN
FIG.7b SWNG FLG
FIG.7c SWNG REQ
FIG.7d HL CLS CR(S)
FIG.7e SWNG INIT
FIG.7f 1ST RLYS
FIG.7g 2ND RELYS
FIG.7i SWNG BK FLG
FIG.7j SWNG BK REQ
FIG.7k SWNG BK INIT

5,272,287

ELEVATOR CAR AND RISER TRANSFER

TECHNICAL FIELD

This invention relates to transferring elevators and elevator risers between operation in a group and operation alone or in another group.

BACKGROUND ART

In one well-known type of third generation, fully computerized elevator control system, a plurality of separate computers are utilized as group controllers (to control dispatching of the cars in a group), car controllers for each of the cars (to control operation and motion of each car), and cab controllers for each car (to control doors and interface with the car operating buttons and lights). This type of system is disclosed generally in U.S. Pat. No. 4,363,381 to Bittar and U.S. Pat. No. 4,497,391 to Mendelsohn et al (FIG. 7). In taller buildings, typically over 10 floors, two group controllers may be provided so as to permit operating some of the cars in a low rise group (such as floors 1–8) and the remaining cars in a high rise group (such as floors 9–15); in taller buildings, more groups may be used.

In some of these situations, one of the cars may be provided with capability to operate at all of the floors (such as for freight or service use). It is known to provide a rear door riser comprising hall call buttons and enunciator lanterns in hallways accessible only through rear doors of the elevator cars. It is also known in such systems to provide a separate riser, constituting semi-hidden hall call buttons and floor enunciator lanterns, which may be mounted inconspicuously in an elevator door frame or the like. The car operating in the hoistway with which the extra riser is associated is typically provided with simplex operation capability, so that it can function in the separate riser independently of the rest of the group and the group controller. Should the group controller fail, the elevators could operate in "wild car" mode, which is simply every car stopping at every floor in its hoistway without regard to hall calls or car calls. In the event of power failure, the simplex car in the special riser could typically operate on emergency power (including fireman service). Other examples of separate risers are found in luxury apartment and condominium buildings, as well as hotels, and buildings with rooftop restaurants. A simple example is the rooftop restaurant which opens for business only after the evening downpeak rush hour of an office building; the separate riser in that case would not be used at all during the day while the elevator operating in the shaft with the separate riser would be servicing all office building floors under normal group control. At evening time, that elevator is taken out of the group and would perform only between the lobby (or other entry floor) level and the rooftop restaurant level. The elevator would be operating in simplex mode, with the remainder of its car call button panel disabled.

In such earlier systems operating with two group controllers, it has been known to provide relay connections from one car to both of the groups. A car which is transferrable from one of the groups to another is referred to in the art as a "swing car"; its transfer is referred to as "swinging"; and its operation outside of its normal group is called "swing operation". This permits switching (for example) from having four cars in the low rise group and two cars in the high rise group to having three cars in each group. However, regardless of other configurational characteristics, the provision of the capability to transfer an elevator from one group which has two risers to another group which has a single riser does not provide any capability to use the extra riser in either group. Thus in the case of failure of the normal riser associated with either group controller, the only option would be wild car operation, without any cognizance of hall calls, and without any enunciation of arriving cars.

DISCLOSURE OF INVENTION

Objects of the invention include increased flexibility in swing car operation, more variety of swing car operation configuration, ability to swing risers between groups and simplex operation, and choice between swinging a riser with an elevator, or not.

According to the present invention, an elevator swing car, provided with switching so as to connect it to a first group of elevators for operation therewith or away from said group to operate independently thereof, either alone or with another group, is associated with a separate riser having switching to enable it to operate within the first group, or to be transferred with a swing car to operate independently of the first group, either in a second group or with the swing car alone.

The invention permits utilizing a separate riser within a group, or alone with a car operating in simplex operation. The present invention greatly enhances the capability of an architect to design an overall elevator configuration which maximizes the use of the fewest number of elevators, provides the greatest accommodation to special floors, and accommodates a maximum amount of reconfiguration following a wide variety of different failure modes. The invention will provide all of the foregoing advantages at relatively low additional cost.

The invention may be implemented utilizing only apparatus and software techniques which are presently available to those skilled in the art in the light of the specific teachings with respect thereto set forth herein.

Other objects, features and advantages of the present invention will become more apparent in the light of the following detailed description of exemplary embodiments thereof, as illustrated in the accompanying drawing.

BRIEF DESCRIPTION OF THE DRAWINGS

FIGS. 7(a)–(k) are diagrams illustrating operation of an elevator system in establishing and ending swing operation, in accordance with the invention.

BEST MODE FOR CARRYING OUT THE INVENTION

Figure 1:
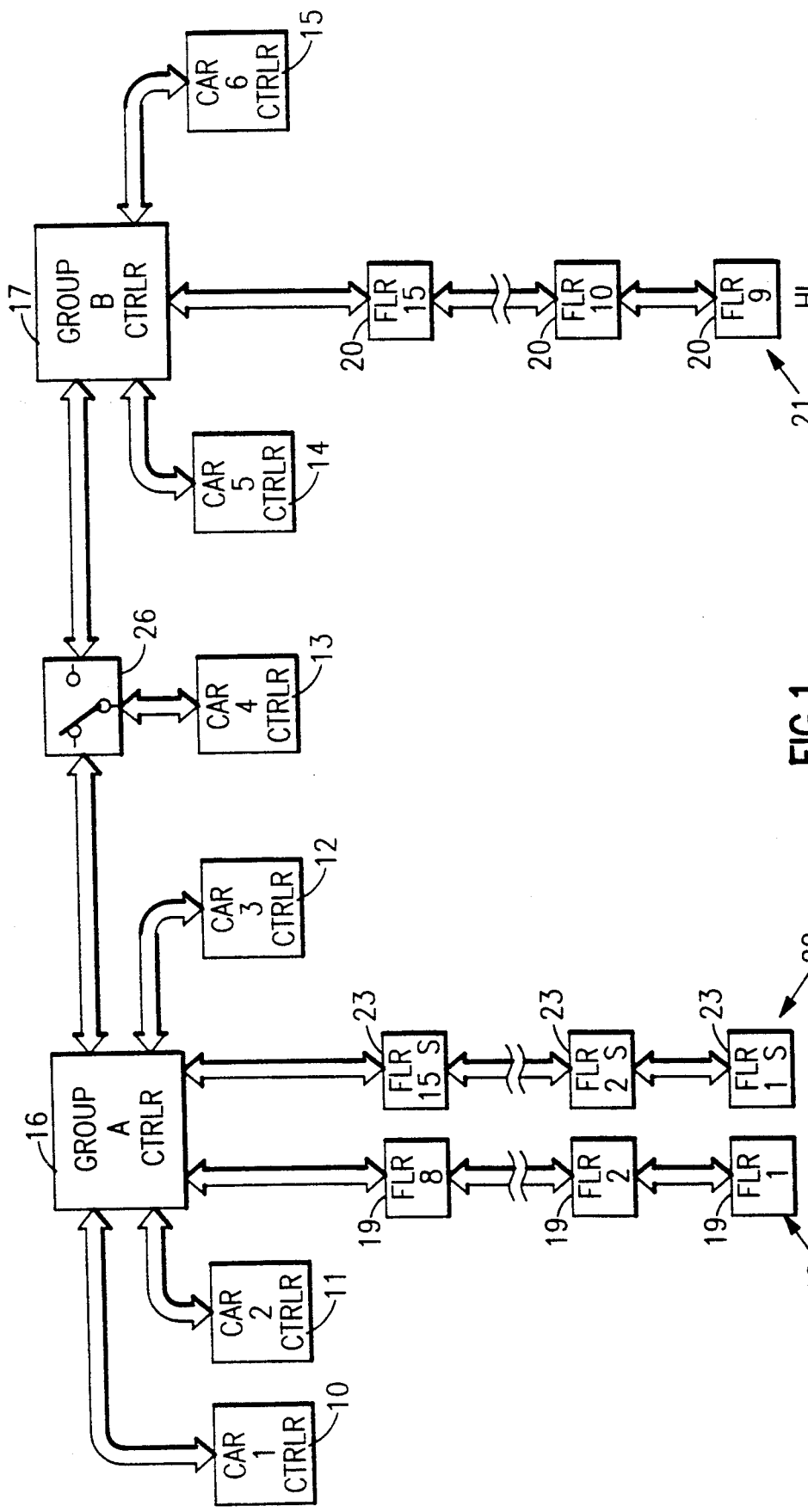
FIG. 1 is a simplified block diagram of a prior art elevator system having the capability to swing an elevator from one group to another.

Referring now to FIG. 1, a plurality of elevator car controllers 10-15 are connected either to a Group A controller 16 or a Group B controller 17 in a known, prior art configuration of the type disclosed in said Bittar patent. The Group A controller 16 is configured as a low rise group working with a low riser 18 including hall call buttons and enunciator lanterns 19 serving the lowest eight floors to call and announce the arrival of corresponding elevator cars 10-13 in the group. Similarly, Group B is arranged as a high rise group, working with hall call buttons and enunciator lanterns 20 of a high riser 21 serving the top six floors. The Group A controller is also provided with a separate riser 22 which may include hall call buttons and lanterns 23 for all of the floors.

The swing car controller 13 is switchable between the Group A controller 16 and the Group B controller 17 by means of a set of relays 26. Although shown as a single pole, the relays 26 would typically comprise twenty or more poles so as to connect the requisite number of wires between the group controllers 16, 17 and the controller 13 of the swing car. Within each of the groups, there is a map of bits to indicate whether each car is in the group or not, which is controlled by the same key switch as activates the relays 26. In that way, the swing car becomes one of the cars of Group A or one of the cars of Group B, and is concomitantly isolated from Group B or Group A, respectively.

The separate riser 22 may be a rear door riser, or may be a riser having a few special floors assigned to it, or it may be a service riser having its hall call buttons and lanterns inconspicuously half-hidden in the frame of an elevator access door, or otherwise. The mode of operation for such a riser is to permit a related one of the cars (car 1-car 6) and its related controller 10-13 to service calls to and be announced upon arrival at the doors being served by the riser 22 (whether they be forward or rear doors). Although depicted in FIG. 1 as connected directly to the Group A controller 16, the riser 22 is normally connected directly to one of the car controllers (e.g., 12, 13). Thus, the swing car 13 may be the one located in the hoistway having the semi-hidden riser 22, or it may be the car having rear doors and therefore be capable of operating with the separate riser 22, if such is a rear riser. On the other hand, the swing car 13 may have no special connection with the separate riser 22, and some other car 12 may have such a special relationship.

In any event, it is clear that the separate riser 22 is not capable of operation under control of the Group A controller 16. Even in the case that the swing car (car 4) with controller 13 is the car which is capable of operating with the separate riser 22 under simplex control (strictly by itself), the riser is totally independent of the Group A controller and not usable thereby. In any case, the simplex car has the capability to declare itself free of the group so that it can continue to operate if the group fails. Thus, a total failure of the group controller would leave only the simplex car operating with a riser; the remaining cars would simply operate in the wild card mode, which is stopping at every floor without regard to car calls and hall calls, while they traverse the entire hoistway.

Figure 2:
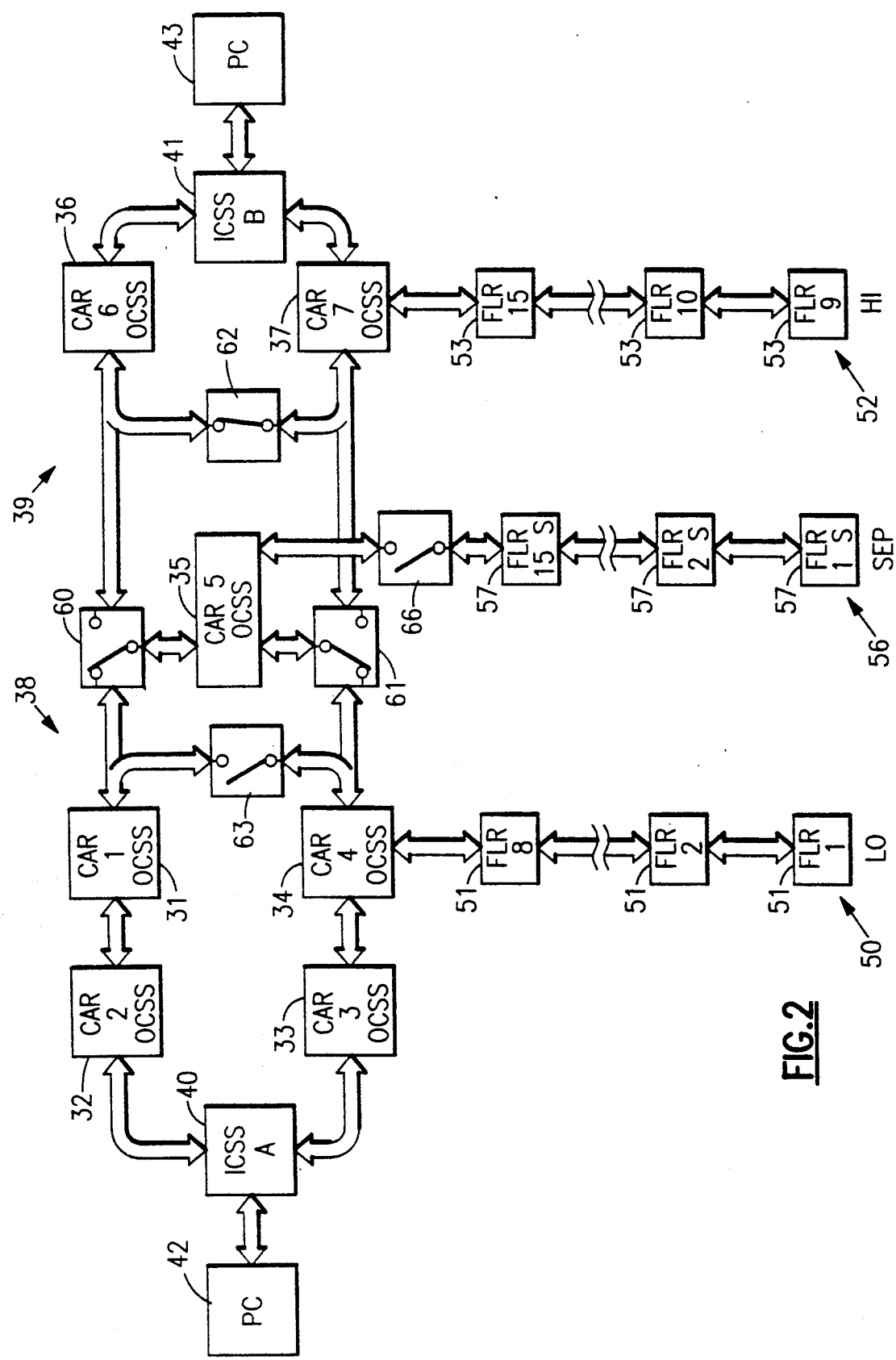
FIG. 2 is a simplified block diagram of an elevator system configuration having two groups, in which the present invention may be incorporated.

In contrast, a configuration in accordance with the present invention shown in FIG. 2 is of a type similar to that shown in U.S. Pat. No. 5,024,296 to Kameli, and includes a plurality of elevator car operational control subsystems (OCSS) 31-37 arranged in rings to form groups 38, 39 with respective information control subsystems (ICSS) 40, 41, each of which has associated therewith a respective personal computer 42, 43 used for control and information transfer between an operator and the respective groups 38, 39. The ICSSs 40, 41 provide communication interface (formatting, etc.) between the OCSSs 31-37 and the PCs 42, 43. Group A 38 may be a low rise group therefore associated with a low riser 50 which has hall call buttons and enunciator lanterns 51 on the lower floors of the building, and Group B 39 may be a high rise group and therefore associated with a high riser 52 which includes hall call buttons and enunciator lanterns 53 for the upper floors of the building. In addition, a separate riser 56 may include hall call buttons and enunciator lanterns 57 for some or all of the floors of the building. The OCSSs and ICSSs are similar data processors programmed for different tasks. The modus operandi of the configuration shown in FIG. 2, is described more fully in, commonly owned copending U.S. patent application of Auer et al, Ser. No. 07/029,495 filed Mar. 23, 1987, now U.S. Pat. No. 5,202,540 in U.S. Pat. No. 4,497,391 to Mendelsohn et al, and in U.S. Pat. No. 4,622,551 to Kupersmith et al, all of which are incorporated herein by reference. All information circulates around the ring in both directions. It includes duplicating the tasks of group control so that each of the car OCSS units 31-37 provides group control functions for all of the cars as well as car control over itself, in such a manner that if an OCSS fails its processing power is lost, the remaining cars are controlled in a group by their remaining OCSS units, with information that flows in either direction as for as, but not beyond, the failed OCSS. The disclosure of Auer et al includes two risers, each connected to a related OCSS and switchable, automatically only upon failure of the related OCSS, to an alternative OCSS. As depicted in FIG. 2, car five is configured as a swing car because its OCSS 35 is connected to switches 60-63, 66, which although configured as single throw, double pole switches would typically comprise four or more poles, and may comprise pairs of single throw switches at each pole. The switches 60-63 may preferably be relays so as to provide assured operation; however, in certain circumstances it may be desirable to utilize electronic switches of a suitable kind to provide the adjustable connections between the groups. In the event that the swing car OCSS 35 is transferred from Group A 38 (as shown) to Group B 39 by transfer of the switches 60, 61 to the right as seen in FIG. 2, a switch 62 is opened so as to permit entry of the swing car OCSS 35 into the ring of Group B 39, and a switch 63 is closed so as to cause the OCSSs 31-34 of cars one-five to continue to be connected in a ring to form Group A with the ICSS 40, but without the OCSS 35 of car 5.

In FIG. 2, the separate riser 56 could be a riser of any of the types described hereinbefore. The riser 56 is connected by switching 66 to the OCSS 35 of the swing car. As shown in FIG. 2, the swing car can operate through its OCSS 35 with Group A 38, and with the riser 66 totally disconnected. On the other hand, by moving the switching 66 to the right as shown in FIG.

2, the riser 56 can be connected to the OCSS 35 of the swing car and operated within Group A 38. Or, the OCSS 35 can be swung with the swing car to Group B 39, with or without the riser 66, depending on how the switching 66 is controlled. A specific advantage of the configuration of FIG. 2 over that of the prior art shown in FIG. 1 is that, should the riser 52 fail, Group B 39 can continue to operate in a normal manner by switching the swing car OCSS 35 together with the riser 66 into Group B 39, and operating all of the cars of Group B through their OCSSs 35–37 with the riser 56.

Swinging of the swing car from Group A 38 to Group B 39 may typically be initiated (in a configuration something like that shown in FIG. 2) by the elevator management system (EMS) either as a function of time (for instance, so that car five can help with the high rise only during rush hour) or as a function of excessive traffic patterns in one or the other of the groups. Similarly, the car can be swung back in response to EMS control. Or, the swinging of the car can be under the control of a lobby panel key switch or a switch in a control room. Typically, swing car operation would be controlled in a control room by means of only one of the PC's 42, 43: normally, both ICSSs 40, 41 would be connected to a single PC in a control room, as described with respect to FIG. 3, hereinafter.

Figure 3:
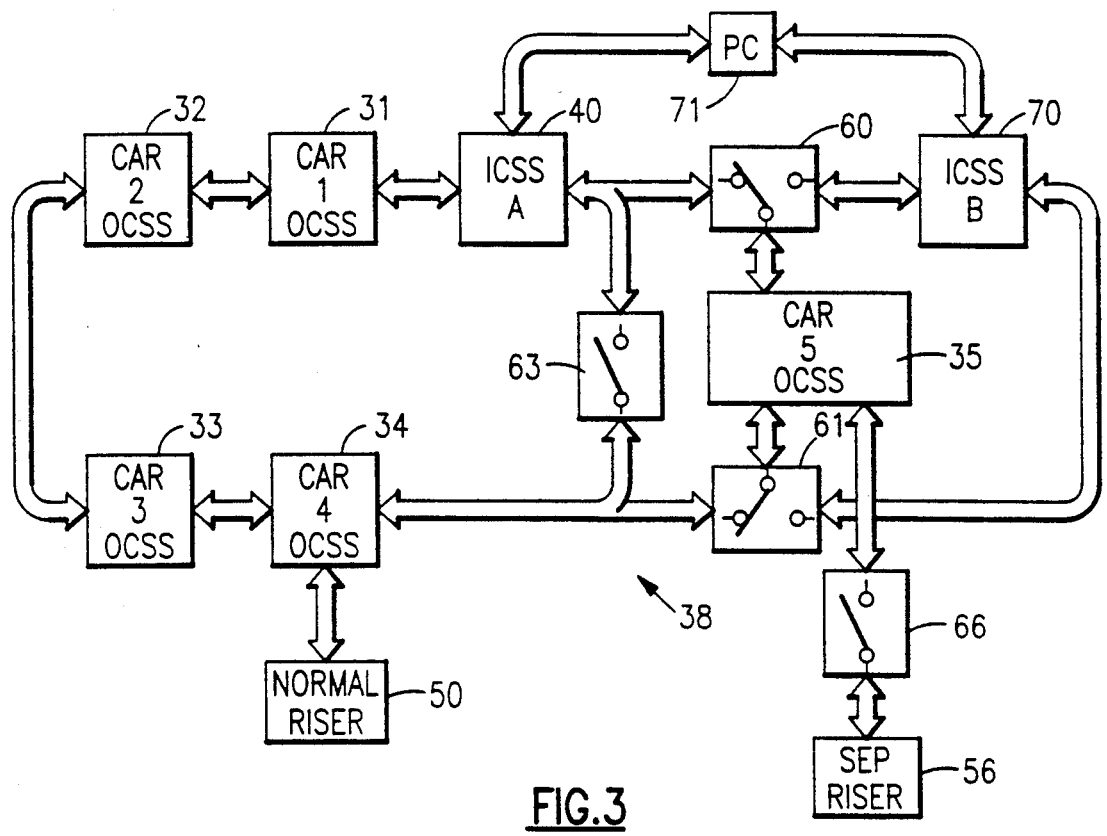
FIG. 3 is a simplified block diagram of an elevator system configuration in which the present invention may be practiced to swing an elevator between a group and simplex operation.
Figure 4:
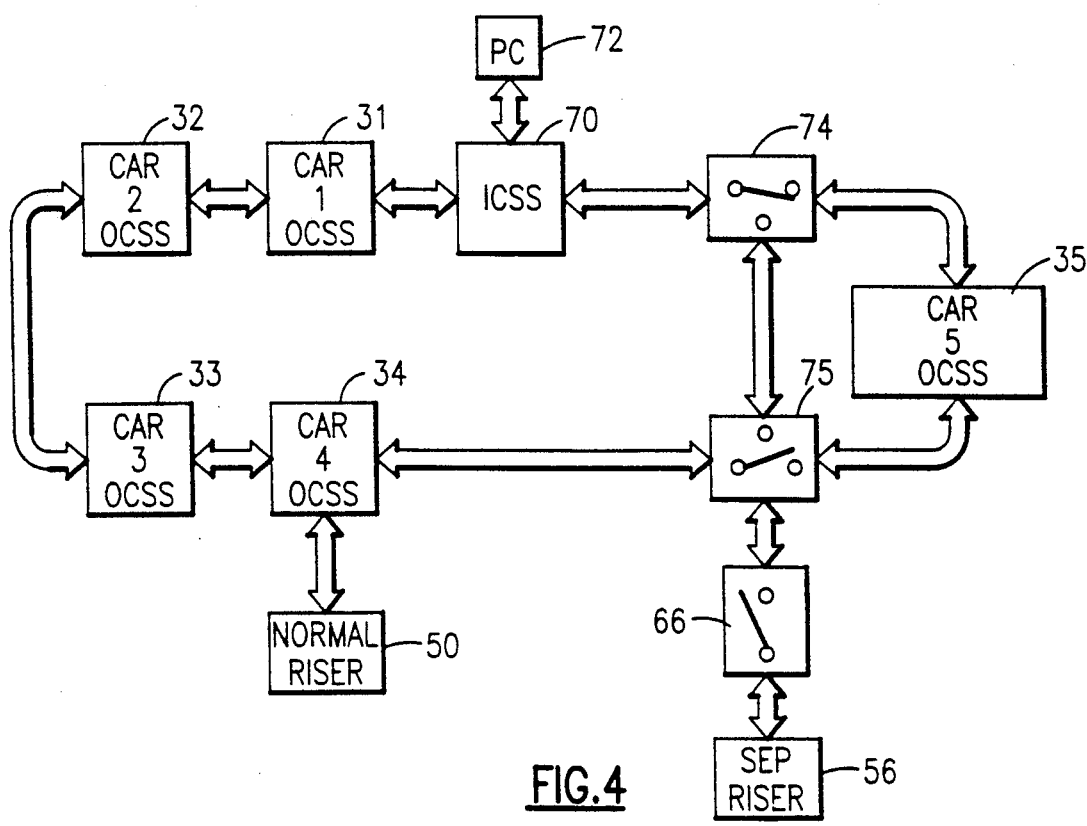
FIG. 4 is a simplified block diagram of another configuration in which an elevator car may be swung between a group and simplex operation in accordance with the present invention.

In FIG. 3, there is shown a simple configuration which allows the OCSS 35 of the swing car to be swung between Group A 38 and simplex operation, all by itself. To achieve that, an ICSS 70, associated with the swing car OCSS 35, is connected to the same PC 71 as the ICSS 40 of Group A. The PC 71 can be used to access Group A 38 through the ICSS 40, as well as the OCSS 35 of the swing car through the ICSS 70. As shown in FIG. 3, the OCSS 35 of the swing car is connected into Group A 38. By transferring the switches 60, 61 and 63 to the right as seen in FIG. 3, the OCSS 35 of the swing car is removed from Group A 38, and Group A 38 is reconfigured by closing the switch 63 to include only the OCSSs 31–34 of cars one-four. Once car five has been disconnected from Group A 38, it becomes connected by the switches 60, 61 into a ring with the ICSS 70, which maintains communication with the PC 71 so as to enable monitoring, manipulating, and switching the car back to the group when needed, under PC control. Having an ICSS maintain communication between a control room PC and each group and simplex elevator allows all elevators to be monitored and remotely manipulated at all times. In any embodiment of the invention where EMS control over the return of the swing car to a group is not required, the initiation of swing operation can be under control of key switches or the like and the ICSS 70 is not required to maintain communication with the PC 71 in such a case, as shown in FIG. 4. To allow operating the swing car in simplex mode, the switch means includes the switches 66, which must be closed to connect the riser 56 to the swing car.

The embodiment of FIG. 3 also illustrates that the embodiment of FIG. 2 could as well be operated with a single PC, provided it is configured in such a way as to be in communication with both of the ICSSs 40, 41. In fact, that is the preferred configuration in the usual case, where one PC in a control room communicates with several groups (and/or a car in simplex mode) through as many ICSSs.

Referring now to FIG. 4, a very typical, simplified embodiment of the invention includes a swing car whose OCSS 35 is connectable either into a group 38 or into simplex operation, without its own ICSS, by means of a pair of relays 74, 75. An ICSS 70 maintains communication between a PC 72 and the group (cars one-four). Car five could be swung out by the EMS (PC, ICSS), but after loosing contact therewith, can be swung back only by a panel key switch, or the like. In this case (as in the embodiment of FIG. 3), the riser 56 must be connected through switches 66 in order to operate in simplex mode therewith.

Figure 5:
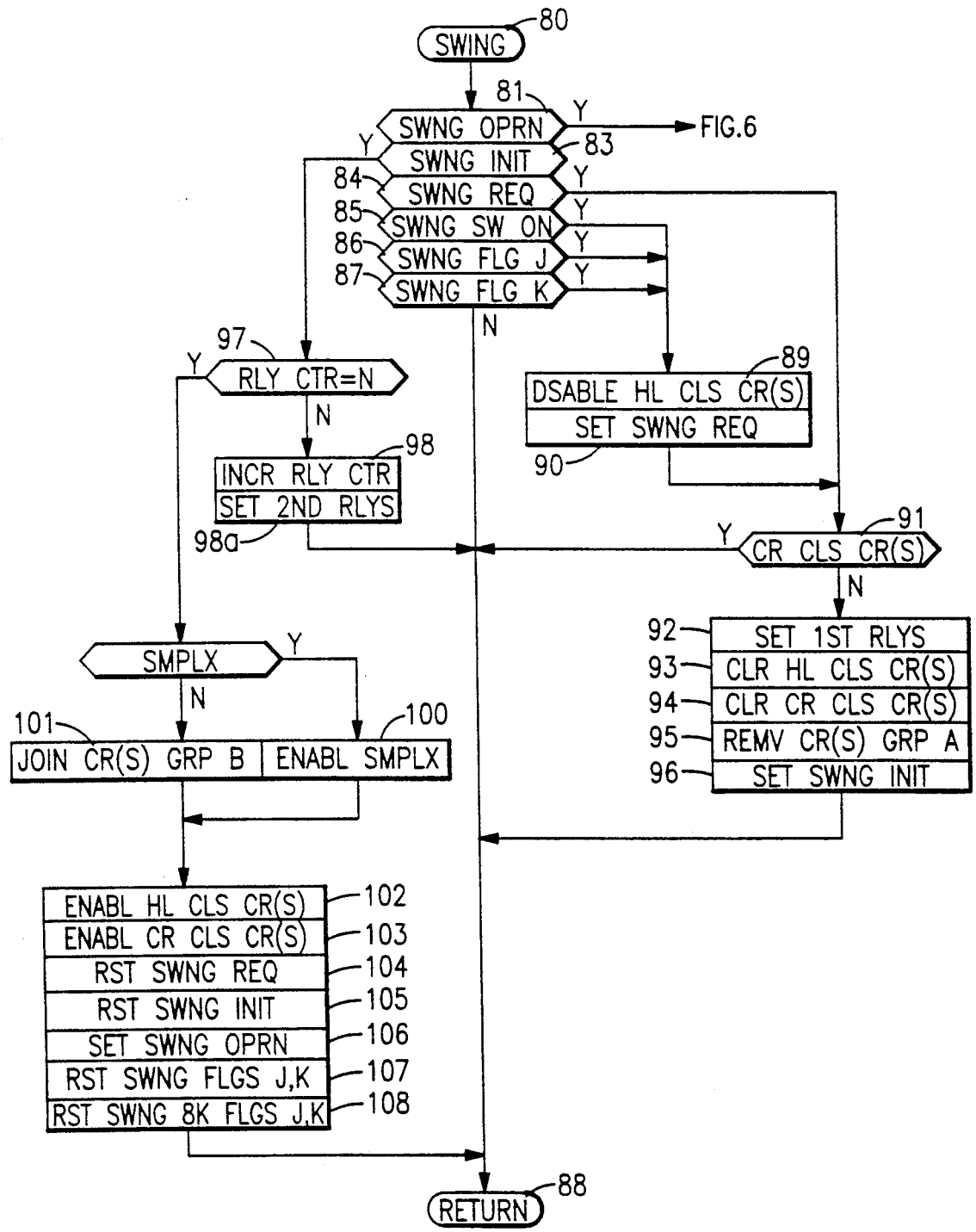
FIGS. 5 and 6 comprise a logic flow diagram of a swing program loop for establishing and ending swing operation, in accordance with the invention.

Referring now to FIG. 5, a software subroutine which may be practiced within the OCSS 35 to control swinging the car between groups or simplex operation, is reached through an entry point 80. First, a test 81 determines if swing operation is currently in effect. If it is, an affirmative result of test 81 will reach a test 82 in FIG. 6, all as is described hereinafter. But, if swing operation is not in effect, as shown in a), FIG. 7, a negative result of test 81 will reach a test 83 to determine if swing has been initiated. In the usual case, the swing operation will not be initiated so a negative result will reach a test 84 to determine if swing operation has been requested (as described hereinafter). In the usual case it will not, so a test 85 is reached to determine if a swing switch is on. This is a switch in a lobby operator's panel or the like which may be used in some embodiments to cause the swing car to be swung out of a group to operation in simplex mode or within another group. In the usual case, the switch will not be on, so a test 86 may be reached to determine if a swing flag (designated as J, arbitrarily,) has been set by the EMS of either group, or some other remote control. If not, another EMS swing flag is checked in a test 87. If all of the results in the tests 81 and 83–87 are negative, other programs are returned to through a return point 88.

Assume that an EMS command to swing the car out of Group A has been received. This may be by setting a swing flag designated as J. In the next pass through the subroutine of FIG. 5, negative results of each of the tests 81 and 83–85 will reach test 86, which this time is affirmative as shown in b), FIG. 7. This reaches a pair of steps 89, 90 in which the hall calls of the swing car are disabled and a swing request flag is set, as shown in c), FIG. 7. Then, a test 91 determines if there are any outstanding car calls in the swing car. If there are, the program simply resorts to other routines through the return point 88. Subsequent passes through the subroutine of FIG. 5 will occur as called for (such as in every cycle of about 100 milliseconds or so), which typically may occur many, many times before all of the car calls of the swing car have been answered. In each such pass through the subroutine of FIG. 5, the negative results of tests 81 and 84–85 will reach an affirmative result of test 86 where the steps 89 and 90 are redundantly performed, and test 91 steers the routine back to the return point 88. Eventually, the car calls of the swing car having all been serviced, as shown in d), FIG. 7, a negative result of test 91 will reach a step 92 where a few relays designated as first relays will be set, shown in f), FIG. 7. By this it is meant that, in the configuration of FIG. 2, for example, the relays 60–62 will have their contacts transferred to the right as seen in FIG. 2, thereby disconnecting the car six OCSS 36 from the car seven OCSS 37 and connecting the car five OCSS 35 therebetween. Then the car calls and the hall calls of the swing car are cleared in steps 93 and 94. Depending on the nature of software involved in the group control, it may be necessary to specifically remove the swing car from Group A as indicated in step 95, which may be accomplished by simply removing the designator for the swing car from a map of cars in the group. When steps 92–95 have been performed, a swing initiate flag is set in a step 96, shown in e), FIG. 7, and other programming is reverted to, through the return point 88.

On the next pass through the subroutine of FIG. 5, a negative result of test 81 will reach test 83 which is now positive, reaching a test 97 to determine if some number of cycles (N) have transpired since setting of the first relays was initiated by step 92. In the first pass, a negative result of test 97 will reach a step 98 in which a relay counter is incremented by one count, and a step 98a sets second relays (e.g., relay 62, FIG. 2 to the right), as shown in g), FIG. 7. Then programming of another sort is reverted to, through the return point 88. As shown in FIG. 7 herein, it is assumed that a delay on the order of three cycles (about a third of a second) may be desired to ensure that the first relays have fully seated themselves and are through bouncing. In such a case, the value of N would be three and the routine would pass through the step 98 three times before an affirmative result of test 97 will reach a test 99 to determine whether simplex operation has been designated in the swing car or not. If the swing car has been designated and equipped for swing car operation in a particular embodiment of the invention (FIGS. 3 and 4), an affirmative result of test 99 will reach a step 100 which enables the swing car to assume simplex operation. If not, a negative result of test 99 will reach a step 101 in which the swing car is added to the set of cars available to Group B (FIG. 2), such as by enabling its designator bit in a map of Group B cars. Thus, following steps 100, 101 the swing car is fully enabled to operate in the new mode, be it within a group or in simplex operation. Thereafter, hall calls and car calls are reenabled in the swing car by steps 102, 103, and the swing request and initiate flags (set in steps 90 and 96) are reset in steps 104, 105. This completes establishing swing operation, so that a swing operation flag is set in a step 106, shown in a), FIG. 7. To ensure that two different requests to either swing one way or the other are not competing in coincidence, the final step of establishing the swing operation is to reset both of the swing flags J and K (which may be tested in tests 86 and 87 herein) as well as swing back flags (described with respect to FIG. 6 hereinafter) in steps 107 and 108. This ensures that either swinging of an elevator out of the group, or swinging an elevator back into the group will be initiated only if the request therefor transitions from off to on while the elevator is in the opposite state of operation.

Figure 6:
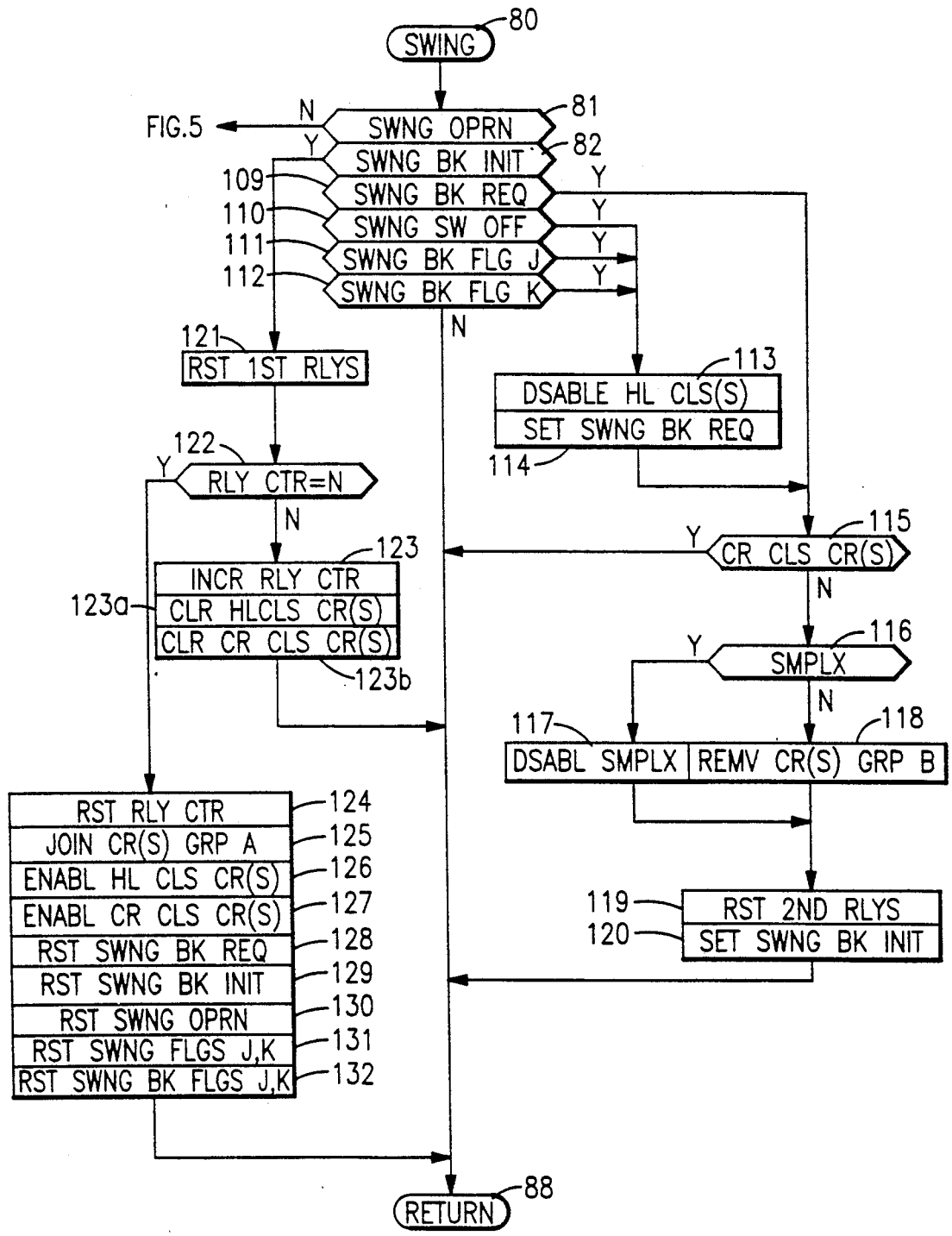

Once swing operation has been established, the next pass through the entry point 80 will reach an affirmative result in the test 81 causing a test 82 to be reached in FIG. 6. The functions of FIG. 6 are very similar to those of FIG. 5. Initially, the swing back initiation flag (described hereinafter) will not have been set so a negative result of test 82 will reach a test 109 which initially will also be negative, since a swing back request flag will also not initially have been set. This will reach a series of tests 110–112 to determine if there has been any request to swing the swing car back into Group A. In the usual case, this will not be so, and a negative result of test 112 will cause other programming to be reverted to through the return point 88.

Eventually, at some point in time, a request to move the car back into the group may be made by virtue of the swing switch or by a command from the EMS which will set one of the swing back flags J or K, as shown in i), FIG. 7. An affirmative result of one of the tests 110–112 will then reach a pair of steps 113, 114, in which the hall calls of the swing car are all disabled, and a swing back request flag is set, as shown in j), FIG. 7. Then a test 115 determines if there are any unserved car calls pending in the swing car. If there are, another program is reverted to, through the return point 88. Eventually, all the car calls will be served, as shown in d), FIG. 7, so a negative result of the test 115 will reach a test 116 to determine whether the car has simplex operation available to it or not. If it has, an affirmative result of test 116 will cause simplex operation to be disabled in the swing car by a step 117. If the car is not capable of simplex operation, then it is assumed that it was assigned to Group B, and it will be removed from the map of available cars for Group B in a step 118. Then, the second relays are reset in a step 119, as shown in g), FIG. 7. What this means in the embodiment of FIG. 2 is that the relays 63 are moved back to the position shown in FIG. 2. Then a step 120 sets the swing back initiate flag, as shown in k), FIG. 7, and other programs are reverted to through the return point 88. In the next cycle, an affirmative result of test 81 and an affirmative result of test 82 will cause a step 121 to be reached which resets the first relays, as shown in f), FIG. 7, causing relays 60–62 to revert to the positions shown in FIG. 2 To ensure adequate operation, the relay counter is again tested in a test 122 and initially the negative result thereof will reach a step 123 wherein the relay counter is incremented. Then the hall calls and car calls of the swing car are cleared in steps 123a and 123b. After three passes through the step 123 (and redundantly the steps 123a and 123b), the relay counter will be set to three (in the example herein) and an affirmative result of test 122 will reach a step 124 which resets the relay counter. Then the swing car is restored to Group A operation by a step 125. Hall calls and car calls are enabled in the swing car by steps 126 and 127, and the swing back request and initiate flags are reset by steps 128 and 129. This completes the swing back function so that swing operation now terminates, and the swing operation flag is reset by a step 130, as shown in a), FIG. 7. After that, the swing flags and swing back flags which may possibly have been set by one or more EMSs are reset in steps 131 and 132, thereby assuring that swing operation can be initiated by an EMS only with an off-to-on transition of one of the swing flags with the car operating in the opposite mode.

In FIG. 3, the first relays will comprise relays 60 and 61 whereas the second relays will comprise the relay 63. In the embodiment of FIG. 4, both relays 74, 75 will comprise first relays since it is inherent that the new contacts cannot be made before the old contacts are broken. Thus, for the embodiment of FIG. 4, step 98a could be eliminated in FIG. 5, and operation in FIG. 6 could advance directly from either of the steps 117, 118 to the step 121, without use of the swing back initiate flag (step 120 and test 86).

Figure 8:
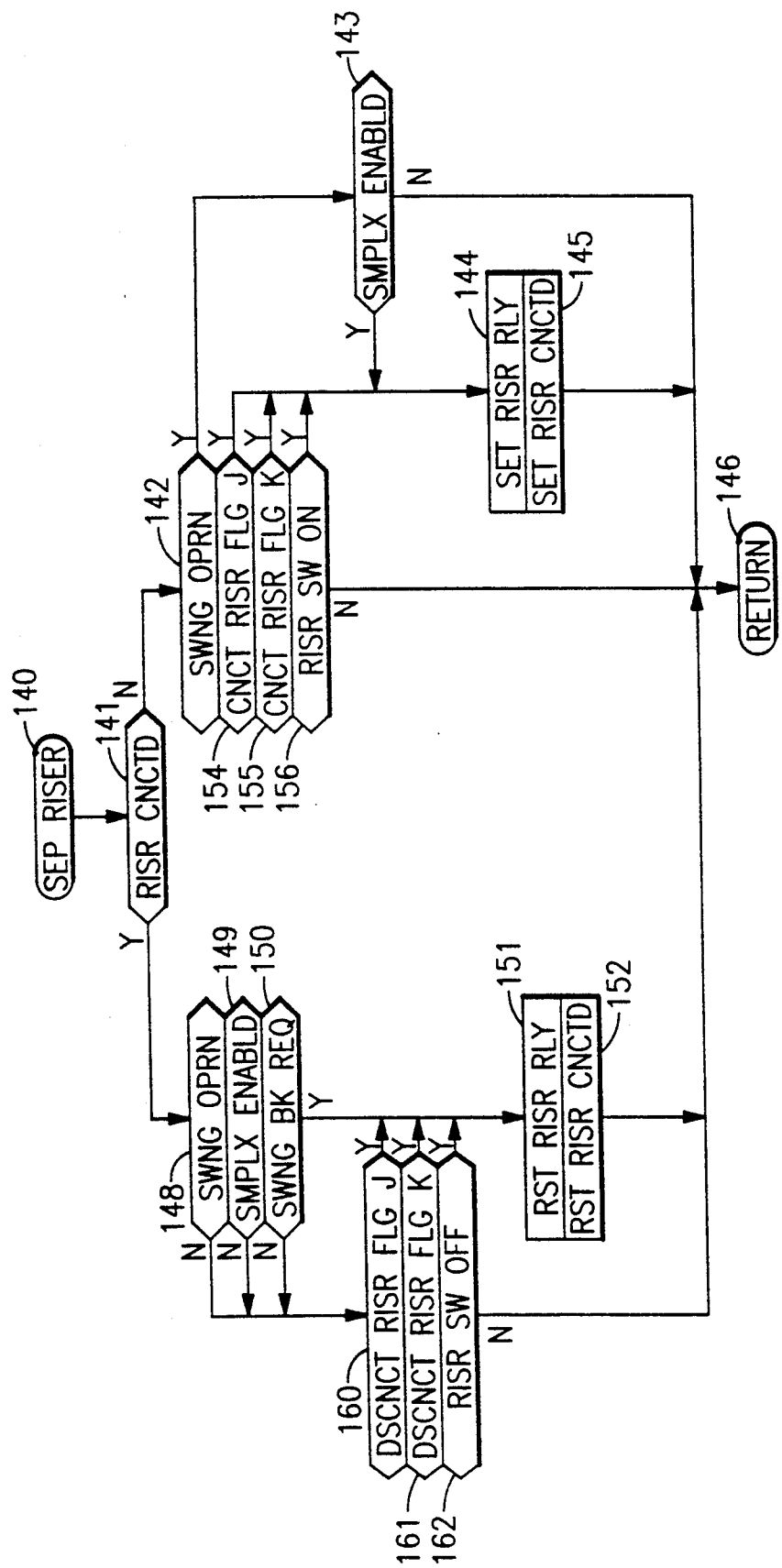
FIG. 8 is a logic flow diagram of a separate riser program loop for connecting and disconnecting a separate riser to a swing car, in accordance with the invention.

Referring now to FIG. 8, an exemplary subroutine which may be utilized to connect and disconnect the separate riser 56 may be reached through an entry point 140, either automatically, directly from the return point 88 in FIGS. 5 and 6, or at some subsequent point in the routines of the OCSS 35. A first test 141 determines whether the riser is currently connected (through the switch 66) or not. In the usual case, it will not be, so a negative result of test 141 will reach a test 142 to see if swing operation is in effect. Assuming that the swing car has been swung out of Group A as described hereinbefore, an affirmative result of test 142 will reach a test 143 to determine if the swing car is enabled for simplex operation, or not. If it is, this means that the swing car is to operate independently utilizing the separate riser 56. In that case, an affirmative result of test 143 will reach a step 144 which will set the riser relay (close the switch 66 in FIGS. 3 and 4 herein), and a step 145 will set a riser connected flag to indicate that the riser is connected. Then, other portions of the program of the OCSS 35 will be reverted to, through a return point 146. In the next pass through the subroutine of FIG. 8, the test 141 will be affirmative because the riser connected flag has been set. Therefore, a step 148 is reached to determine if the riser has been connected as a consequence of swing operation. In this case, the answer will be affirmative, thereby reaching a test 149 to see if the swing car is operating in the simplex mode. In this case, since simplex swing car operation is the reason that the riser was connected, the test 149 will be affirmative reaching a test 150 to determine if swing back is in progress. Naturally, the car will not be swung back (in the usual case) for a very large number of cycles, so that normally the result of test 150 will be negative. But assuming that swing back is eventually requested, then all three of the tests 148-150 will be affirmative reaching a pair of steps 151, 152 wherein the riser relay is reset (the switch 66 is restored to the position shown in FIGS. 3 and 4) and the riser connected flag is reset, to indicate that the riser is no longer connected. Then, other programming is reverted to through the return point 146. The foregoing illustrates how the riser can be connected automatically when a swing operation occurs with a swing car which is to operate in simplex mode, and how it can thereafter be disconnected when the car is swung back to the group, as described hereinbefore.

Assume now that the riser is not connected and swing operation is not in effect. In a pass through the subroutine of FIG. 8 reached through the entry point 140, the result of test 141 will be negative reaching test 142. Since a swing operation is not in effect, test 142 will be negative reaching a test 154 which determines whether one of the groups or some other EMS has set a connect riser flag, arbitrarily referred to as J. If not, another test will determine if another possible connect riser flag, arbitrarily referred to as K, has been set. If not, a test 156 will determine whether or not a key operated riser connection switch (or the like) is on at the moment, or not. If all of the tests 142-156 are negative, then other programming is simply reverted to, through the return point 146. However, should the riser be commanded to be connected, either by an EMS with flag J or flag K or by an operator turning the riser switch on, one of the tests 154-156 will be affirmative reaching the steps 144, 145 to connect the riser as described hereinbefore. In subsequent passes through the subroutine of FIG. 8, the test 141 will be affirmative. But, since test 148 will be negative, a series of tests 160-162 will be reached to determine whether an EMS has set a disconnect riser flag (arbitrarily designated as J or K) or the riser key switch has been turned to the off position momentarily. If not, other programming is reverted to, through the return point 146. But if so, the steps 151 and 152 will be reached so as to reset the riser relay and reset the riser connected flag as described hereinbefore.

It should be understood that the riser may be connected for specific operation while the swing car is connected to Group A, and in such case, the swing car could be operated in a special fashion by Group A, or the riser could be reached and utilized by all of the cars one-four in the group, all of which is wholly immaterial to the present invention. Similarly, the riser could be connected when the swing car is swung out of Group A, whether it be swung into Group B or operating in simplex mode. If operating in Group B, it may make the riser available to all of cars five-seven, or it may operate car five specially by Group B, all of which is also irrelevant to the present invention.

It should be emphasized that the nature of use of a separate riser, the number of floors that it may serve, whether it is served by front doors or rear doors, are all irrelevant to the present invention, which relates to swinging a swing car out of a ring of data processors, either into another ring of data processors or to simplex operation, and concomitantly being able to selectively connect a separate riser through the data processor (OCSS) of said car either into a ring of data processors operating as a group, or for operation with the swing car alone, in the simplex mode.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An elevator system for serving a number of floors of a building, including a swing car which may be transferred from operation within a first dispatching group to operation alone, comprising:

a first riser including a first set of up direction hall call buttons and enunciator lanterns for all of the floors to be served by said first group except the highest floor and down direction hall call buttons and enunciator lanterns for all of said floors except the lowest, said buttons operable to provide first hall call signals indicative of requested service;

a second riser including a second set of up direction hall call buttons and enunciator lanterns for a number of floors in the building and down direction hall call buttons and enunciator lanterns for said number of floors, the buttons in said second set operable to provide second hall call signals indicative of requested service;

a plurality of elevators, each including a car operating in a hoistway, car motion means for providing and arresting the motion of the car, car call means for registering requests for service initiated by passengers therein and for providing car call signals indicative thereof, door means for providing ingress to and egress from said car, and means for providing operation signals indicative of conditions of said car;

signal processing means associated with said elevators and responsive to said hall call signals, said car call signals, and said operation signals for assigning each of said hall call requests to a selected car, and for causing each of said car motion means to move the related one of said cars to appropriate floors and provide service indicated by corresponding ones of said car call requests and assigned ones of said first hall call requests, and for operating enunciator lanterns of said first set to indicate a car approaching a floor to provide service;

swing command means for providing a swing signal indicating that one of said cars, designated as a swing car, should be transferred from operation in said first group; and switch means for transferring a plurality of connections in response to a set signal received thereby;

wherein the improvement comprises:

said signal processing means consisting of a plurality of distinct data processors connected in a communication ring with said switch means, each data processor corresponding to one of said elevators;

the one of said data processors corresponding to said swing car being responsive to said swing signal for providing said set signal to said switch means; and said switch means being operable in response to said set signal to disconnect said one data processor from adjacent ones of said data processors contiguous therewith in said ring, to directly connect said adjacent data processors to each other in place of said one data processor, and to connect said second riser to said one data processor, thereby enabling said swing car to operate in response to said second hall call signals and to operate enunciator lanterns of said second set to announce arrival of said swing car to selected ones of said number of floors, while others of said cars remain operative as a group with said first set of hall call buttons and enunciator lanterns.

2. An elevator system according to claim 1 wherein:

said swing command means comprises means for providing a swing back signal to said one data processor;

said one data processor provides a reset signal to said switch means in response to said swing back signal; and said switch means is responsive to said reset signal to disconnect said second riser from said one data processor, to disconnect said adjacent data processors from each other, and to reconnect said one data processor between said adjacent data processors in said ring.

3. An elevator system for serving a number of floors of a building, including a swing car which may be transferred from operation within a first dispatching group to operation within a second group, comprising:

a first riser including a first set of up direction hall call buttons and enunciator lanterns for all of a set of first floors to be served by said first group except the highest thereof and down direction hall call buttons and enunciator lanterns for all of said first floors except the lowest thereof, said buttons operable to provide first hall call signals indicative of requested service;

a second riser including a second set of up direction hall call buttons and enunciator lanterns for all of a set of second floors to be served by said second group except the highest thereof and down direction hall call buttons and enunciator lanterns for all of said second floors except the lowest thereof, said buttons of said second set operable to provide second hall call signals indicative of requested service;

a plurality of elevators, each including a car operating in a hoistway, car motion means for providing and arresting the motion of the car, car call means for registering requests for service initiated by passengers therein and for providing car call signals indicative thereof, door means for providing ingress to and egress from said car, and means for providing operation signals indicative of conditions of said car, said elevators being disposed in a first group and a second group, one elevator in said first group being designated a swing car;

first signal processing means associated with said first group of elevators and responsive to said first hall call signals, and to car call signals and said operation signals of said first group of elevators, for assigning each of said first hall call requests to a selected car of said first group, and for causing each of said car motion means to move said selected car to appropriate floors and provide service indicated by corresponding ones of said car call requests and assigned ones of said first hall call requests, and for operating enunciator lanterns of said first set to indicate a car approaching a floor to provide service;

second signal processing means associated with said second group of elevators and responsive to said second hall call signals, and to car call signals and said operation signals of said second group of elevators, for assigning each of said second hall call requests to a selected car of said second group, and for causing each of said car motion means to move said selected car to appropriate floors and provide service indicated by corresponding ones of said car call requests and assigned ones of said second hall call requests, and for operating enunciator lanterns of said second set to indicate a car approaching a floor to provide service;

swing command means for providing a swing signal indicating that one of said cars, designated as a swing car, should be transferred from operation in said first group to operation in said second group; and switch means for transferring a plurality of connections in response to a set signal received thereby;

wherein the improvement comprises:

said first signal processing means consisting of a plurality of distinct data processors connected in a first communication ring with elements of said switch means, each data processor corresponding to one of said first group of elevators;

said second signal processing means consisting of a plurality of distinct data processors connected in a second communication ring with elements of said switch means, each data processor corresponding to one of said second group of elevators;

the one of said data processors corresponding to said swing car being responsive to said swing signal for providing said set signal to said switch means; and said switch means being operable in response to said set signal to disconnect said one data processor from adjacent ones of said data processors contiguous therewith in said first ring, to disconnect a pair of contiguous ones of said data processors in said second ring, to connect said one data processor between said pair of contiguous data processors in said second ring, and to directly connect said adjacent data processors of said first ring to each other in place of said one data processor, thereby enabling said swing car to operate in said second group with said second riser, while others of said cars in said first ring remain operative as a group with said first riser.

4. An elevator system according to claim 3 wherein:

said swing command means comprising means for providing a swing back signal to said one data processor;

said one data processor providing a reset signal to said switch means in response to said swing back signal; and said switch means being responsive to said reset signal to disconnect said adjacent data processors in said first ring from each other, and to reconnect said one data processor between said adjacent data processors in said first ring, and to reconnect said contiguous data processors of said second ring together, thereby returning operation of said swing car to said first group.

* * * * *